US007043336B2

(12) United States Patent
Ryu

(10) Patent No.: US 7,043,336 B2
(45) Date of Patent: May 9, 2006

(54) DATA PROCESSING METHOD FOR A MEMORY PACK OF AN INTERNET MICROWAVE OVEN

(75) Inventor: Han-Gyu Ryu, Suwon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 111 days.

(21) Appl. No.: 10/108,261

(22) Filed: Mar. 28, 2002

(65) Prior Publication Data

US 2002/0161552 A1 Oct. 31, 2002

(30) Foreign Application Priority Data

Apr. 9, 2001 (KR) .............................. 2001-18684

(51) Int. Cl.
*G06F 19/00* (2006.01)

(52) U.S. Cl. ........................ 700/208; 700/100; 700/83; 219/714

(58) Field of Classification Search .................. 700/83, 700/17, 21, 209, 207, 11, 90, 100; 126/19–22; 437/90–91; 219/714, 702, 678, 679, 720, 219/391, 414, 697; 99/327, 408
See application file for complete search history.

(56) References Cited

U.S. PATENT DOCUMENTS

| | | | | |
|---|---|---|---|---|
| 5,967,021 | A * | 10/1999 | Yung | 99/327 |
| 6,137,095 | A * | 10/2000 | Kashimoto et al. | 219/702 |
| 6,444,965 | B1 * | 9/2002 | Ha et al. | 219/702 |
| 6,549,818 | B1 * | 4/2003 | Ali | 700/90 |
| 2003/0109938 | A1 * | 6/2003 | Daum et al. | 700/11 |
| 2003/0141295 | A1 * | 7/2003 | Ishikawa et al. | 219/697 |

FOREIGN PATENT DOCUMENTS

EP 1041860 A2 * 4/2000

* cited by examiner

*Primary Examiner*—Kidest Bahta
(74) *Attorney, Agent, or Firm*—Staas & Halsey LLP

(57) ABSTRACT

A data processing method and apparatus of a memory pack of an Internet microwave oven. A computer is connected to a Web server and a detachable memory pack includes an interface unit performing an interface operation to access the computer. A memory pack control unit transmits or receives information to/from the Web server, through the interface unit, and controls the operation of the detachable memory pack. A storage unit stores the information received by the memory pack control unit. An Internet microwave oven includes the detachable memory pack and accesses the information stored in the detachable memory pack.

16 Claims, 10 Drawing Sheets

FIG. 4b

| Section | M0 | M1 | M2 | M3 | M4 | M5 | M6 | M7 | M8 | M9 | M10 | M11 | M12 | M13 | M14 | M15 |
|---|---|---|---|---|---|---|---|---|---|---|---|---|---|---|---|---|
| 00 | COOKING TIME | | POWER | FLAG | | | Check an insertion of EEPROM | | | | | | | | | CHECK SUM |
| 10 | P | T | - | S | A | L | A | D | BLANK | P | 0 | T | A | T | 0 | " |
| 20 | BLANK | S | A | L | A | D | BLANK | A | BLANK | L | A | BLANK | P | R | 0 | " |
| 30 | V | E | N | C | E | BLANK | BLANK | BLANK | BLANK | BLANK | BLANK | BLANK | BLANK | BLANK | BLANK | " |
| 40 | I | N | G | R | E | D | J | E | N | T | S | : | 6 | 0 | 0 | " |
| 50 | BLANK | G | BLANK | P | 0 | T | A | T | 0 | E | S | , | BLANK | 3 | 0 | " |
| 60 | 0 | BLANK | G | BLANK | T | 0 | M | A | T | 0 | E | S | , | BLANK | 2 | " |
| 70 | BLANK | 0 | N | I | 0 | N | S | , | BLANK | 4 | BLANK | A | N | C | R | " |
| 80 | 0 | V | I | E | S | , | BLANK | 6 | BLANK | T | B | S | P | . | BLANK | " |
| 90 | 0 | L | I | V | E | BLANK | 0 | I | L | , | BLANK | 4 | BLANK | T | B | " |
| A0 | S | P | . | BLANK | L | E | M | 0 | N | BLANK | J | U | I | C | E | " |
| B0 | , | BLANK | 1 | BLANK | T | B | S | P | . | BLANK | B | R | A | N | D | " |
| C0 | Y | , | BLANK | 0 | . | 5 | BLANK | T | B | S | P | . | BLANK | M | 0 | " |
| D0 | S | T | A | R | D | , | BLANK | 1 | 0 | 0 | BLANK | G | BLANK | B | L | " |
| E0 | A | C | K | BLANK | 0 | L | I | V | E | S | BLANK | . | | | | " |
| F0 | | | | | | | | | | | | | | | | " |

DATA PROCESSING METHOD FOR A MEMORY PACK OF AN INTERNET MICROWAVE OVEN

CROSS-REFERENCE TO RELATED APPLICATIONS

This application claims the benefit of Korean Application No. 2001-18684, filed Apr. 9, 2001, in the Korean Intellectual Property Office, the disclosure of which is incorporated herein by reference.

BACKGROUND OF THE INVENTION

1. Field of the Invention

The present invention relates generally to a microwave oven, and more particularly to a data processing method for a memory pack of an Internet microwave oven to store or delete cooking information in or from a detachable memory pack.

2. Description of the Related Art

As well known to those skilled in the art, microwave ovens are appliances for cooking food using microwaves; different from other cooking appliances using an external heat source to heat food by heat conduction and radiation. Generally, such microwave ovens have a memory within a main body for storing predetermined cooking information. Further, the microwave ovens may operate automatically according to cooking information selected by the user, or may be operated according to cooking information manually set by the user.

Recently, as a variety of foods cooked by microwave ovens have developed, the number of cooking methods have increased and new cooking methods are also continuously proposed. The foods cooked by the microwave oven are various, but all of the cooking methods can not be stored in a memory installed in a main body of the conventional microwave oven due to a limited capacity of the memory; thus, causing inconvenience to a user or increased manufacturing costs of microwave ovens having a large memory for storing a plurality of cooking information. Additionally, the user is not able to input desired additional cooking information to the memory of the microwave oven; thus, preventing the user from cooking some foods not listed in a basic menu and further preventing the user from updating the cooking methods.

SUMMARY OF THE INVENTION

Various objects and advantages of the invention will be set forth in part in the description that follows and, in part, will be obvious from the description, or may be learned by practice of the invention.

Accordingly, the present invention has been made keeping in mind the above problems occurring in the prior art, and an object of the present invention is to provide a data processing method for a memory pack of an Internet microwave oven.

In order to accomplish the above and other objects, the present invention provides a data processing method of a memory pack of an oven, the oven including a memory pack, which includes an interface unit connected to a computer accessible to the Internet, a connection unit connected to an oven body, a storage unit storing data, and a control unit controlling the storage unit to store data received through the interface unit, the method including: executing a preset control program when the memory pack is connected to the computer allowing cooking information stored in the memory pack to be displayed; and changing the cooking information stored in the memory pack according to a user operation.

The present invention further provides a data processing method of a memory pack installed in an oven and connected to a computer, the method includes: connecting the computer to a Web server; entering an access code and a secret number in the computer; transmitting the access code and the secret number to the Web server; authenticating the access code and the secret number to authenticate the computer; and transmitting a preset authentication signal to the computer allowing a user to access data stored in the memory pack and data from the Web server.

A data processing method of a memory pack installed in an oven and connected to a computer, the method including: connecting the computer to a Web server; displaying cooking information from at least one of the memory pack and the Web server; selecting an address in the memory pack, without user intervention, to store additional cooking information; selecting the additional cooking information from the Web server using the computer; downloading the additional cooking information from the Web server to the memory pack; and writing the downloaded data to the selected address on the memory pack.

The present invention further provides a data processing apparatus, including: a computer connected to a Web server; a detachable memory pack including an interface unit performing an interface operation to access the computer, a memory pack control unit transmitting or receiving information to or from the Web server, through the interface unit, and controlling the operation of the detachable memory pack, and a storage unit storing the information received by the memory pack control unit; and an Internet microwave oven including the detachable memory pack and accessing the information stored in the detachable memory pack.

These together with other objects and advantages, which will be subsequently apparent, reside in the details of construction and operation as more fully hereinafter described and claimed, reference being had to the accompanying drawings forming a part thereof, wherein like numerals refer to like parts throughout.

BRIEF DESCRIPTION OF THE DRAWINGS

The above and other objects, features and other advantages of the present invention will be more clearly understood from the following detailed description taken in conjunction with the accompanying drawings, in which:

FIG. 4*b* is a diagram showing the memory map according to the present invention;

DETAILED DESCRIPTION OF THE PREFERRED EMBODIMENTS

Hereinafter, embodiments of the present invention will be described in detail with reference to the attached drawings.

Figure 1:
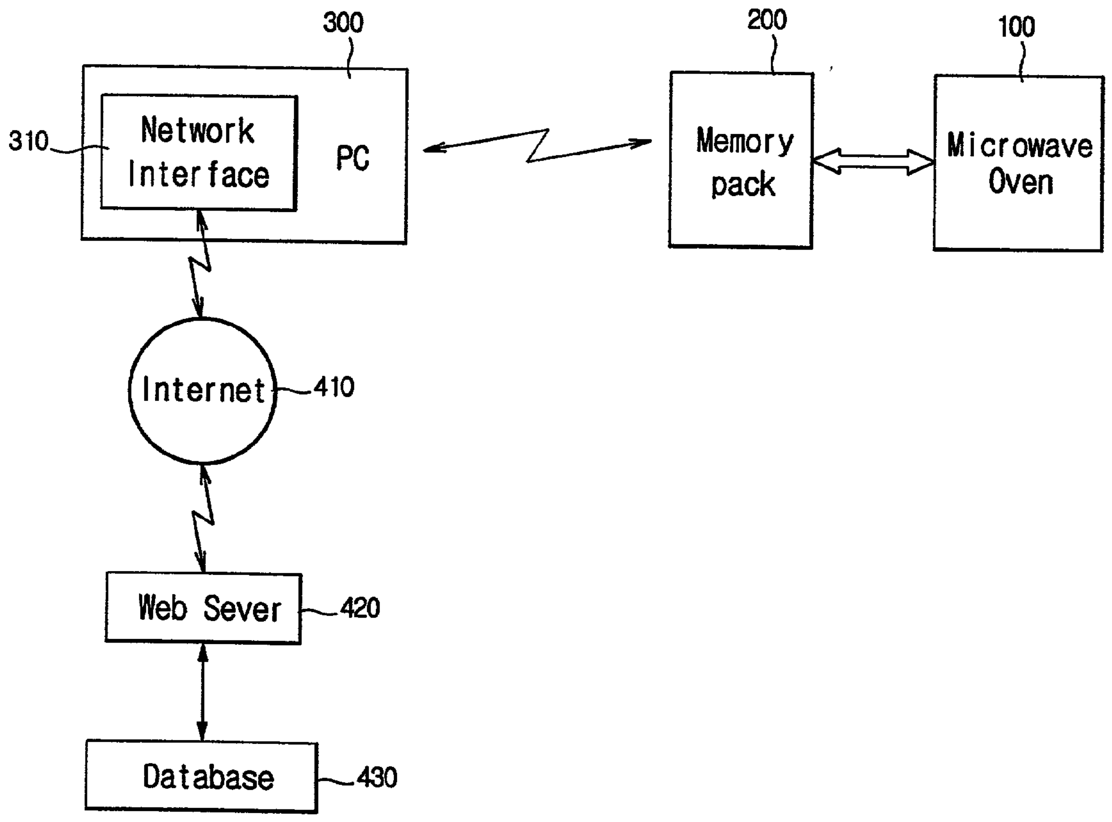
FIG. 1 is a block diagram of a memory pack according to the present invention.

FIG. 1 is a block diagram of an Internet microwave oven according to the present invention.

Referring to FIG. 1, the Internet microwave oven of this invention includes a memory pack 200 and an oven body 100. The memory pack 200 stores a plurality of cooking information obtained through a computer 300, which is connected to a Web server 420 on the Internet 410 via a network interface 310. The oven body 100, from which the memory pack 200 is detachable, cooks foods according to cooking information stored in the memory pack 200.

Figure 2:
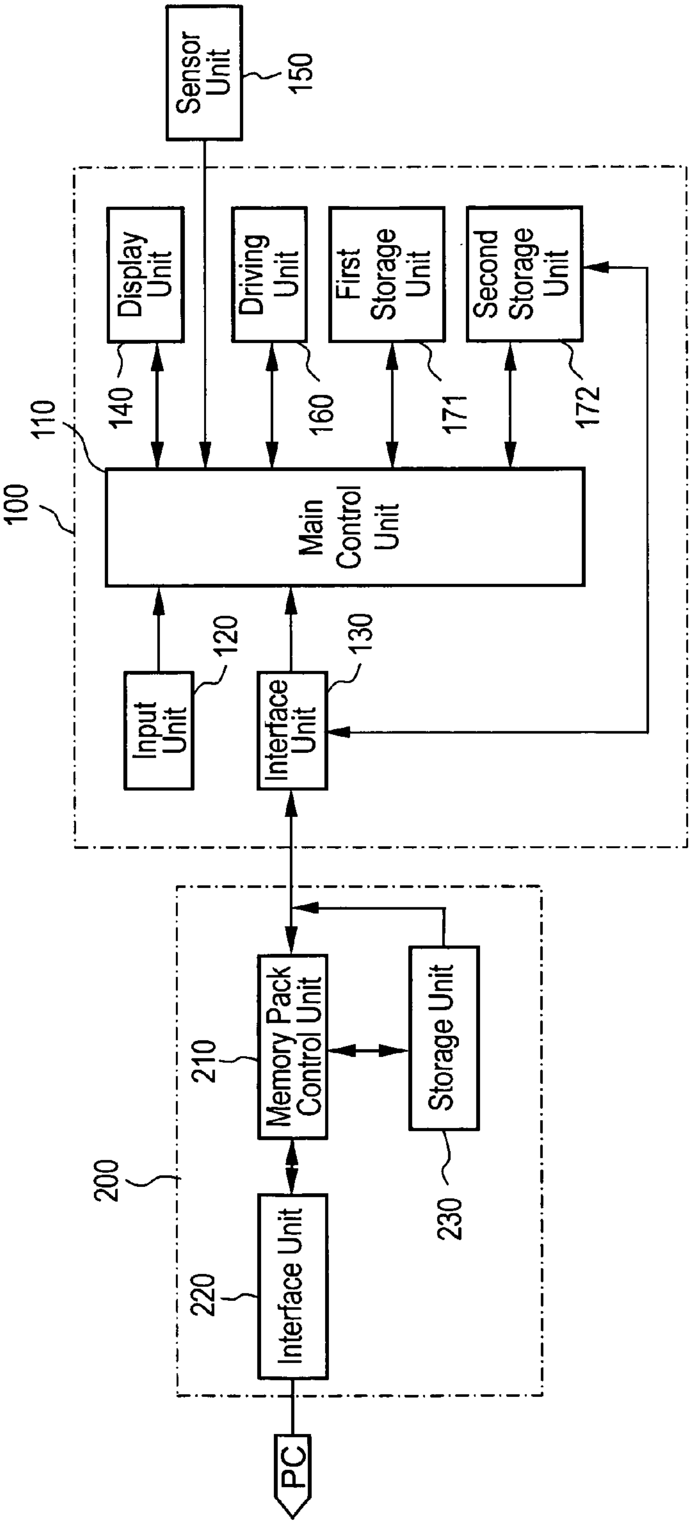
FIG. 2 is a detailed block diagram of the memory pack according to the present invention.

FIG. 2 is a detailed block diagram of the memory pack 200 in accordance with the present invention. Referring to FIG. 2, the memory pack 200 includes an interface unit 220, a memory pack control unit 210, and a storage unit 230. The interface unit 220 performs an interface operation to access the computer 300. The control unit 210 transmits and receives information to/from the computer 300 through the interface unit 220, and controls the operation of the memory pack 200. The storage unit 230 stores the cooking information received by the control unit 210. The interface unit 220 may be embodied as one of devices agreeing with an RS-232C standard, a Universal Serial Bus (USB) standard, and an Institute of Electrical and Electronics Engineers (IEEE) 1394 standard, which are standards for serial communication means that may be installed in the computer 300. In an exemplary embodiment of this invention, the interface unit 220 employs the RS-232C device. The storage unit 230 is realized as an Electrically Erasable Read Only Memory (EEPROM) or a flash memory such that it can retain the stored data even if the power is turned off. Further, the storage unit 230 can be realized as another type of memory having the function of storing data.

The oven body 100 includes a main control unit 110, an input unit 120, an interface unit 130, a display unit 140, a driving unit 160, a first storage unit 171 and a second storage unit 172. The main control unit 110 controls an entire operation of the oven body 100. The input unit 120 inputs operation commands from a user. The display unit 140 displays operation information of the microwave oven. The interface unit 130 interfaces the oven body 100 with the memory pack 200. The driving unit 100 operates the magnetron under the control of the main control unit 110. The first storage unit 171 stores control programs of the microwave oven and basic menus, while the second storage unit 172 stores extension menus and user-set information. The main control unit 110 receives detection signals from the sensor unit 150. The sensor unit 150 outputs to the main control unit 10 information detected by various sensors to control cooking operations, including a temperature sensor to sense the temperature of a cooking room.

Figure 3:
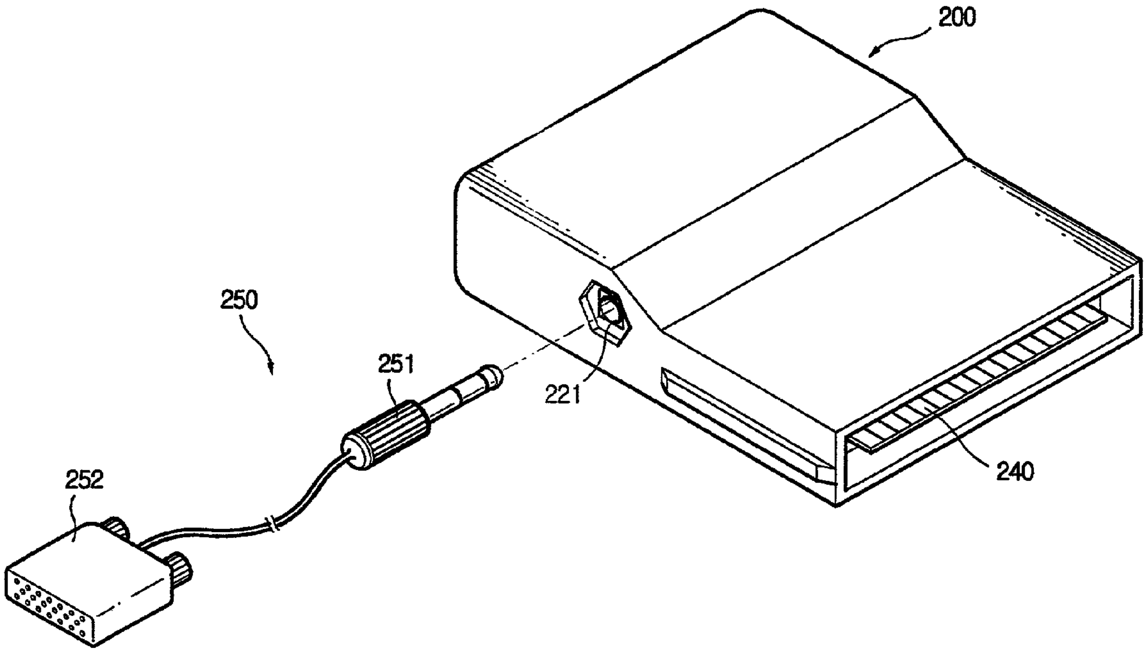
FIG. 3 is a perspective view showing the memory pack according to the present invention.

FIG. 3 is a perspective view showing the memory pack 200 of this invention. Referring to FIG. 3, a connection hole 221 is formed on one side of the memory pack 200 to receive a cable 250 used to connect the interface unit 220 in the memory pack 200 with the computer 300. Further, a connection terminal 240 to be connected to the oven body 100 is formed on another side of the memory pack 200. In an exemplary embodiment of this invention, the cable 250 is provided at one end with an RS-232C port 252 and at another end with a type of audio plug-in mini phone jack 251 for easy connection.

When the mini phone jack 251 is inserted into the connection hole 221, the memory pack control unit 210 transmits a preset signal to the computer 300. Accordingly, the computer 300 may determine whether or not the memory pack 200 is connected to the computer 300.

The storage unit 230 in the memory pack 200 as a non-volatile memory is an EEPROM capable of electrically erasing or writing data. Further, the storage unit 230 can be replaced with another memory similar to the EEPROM.

Figure 4A:
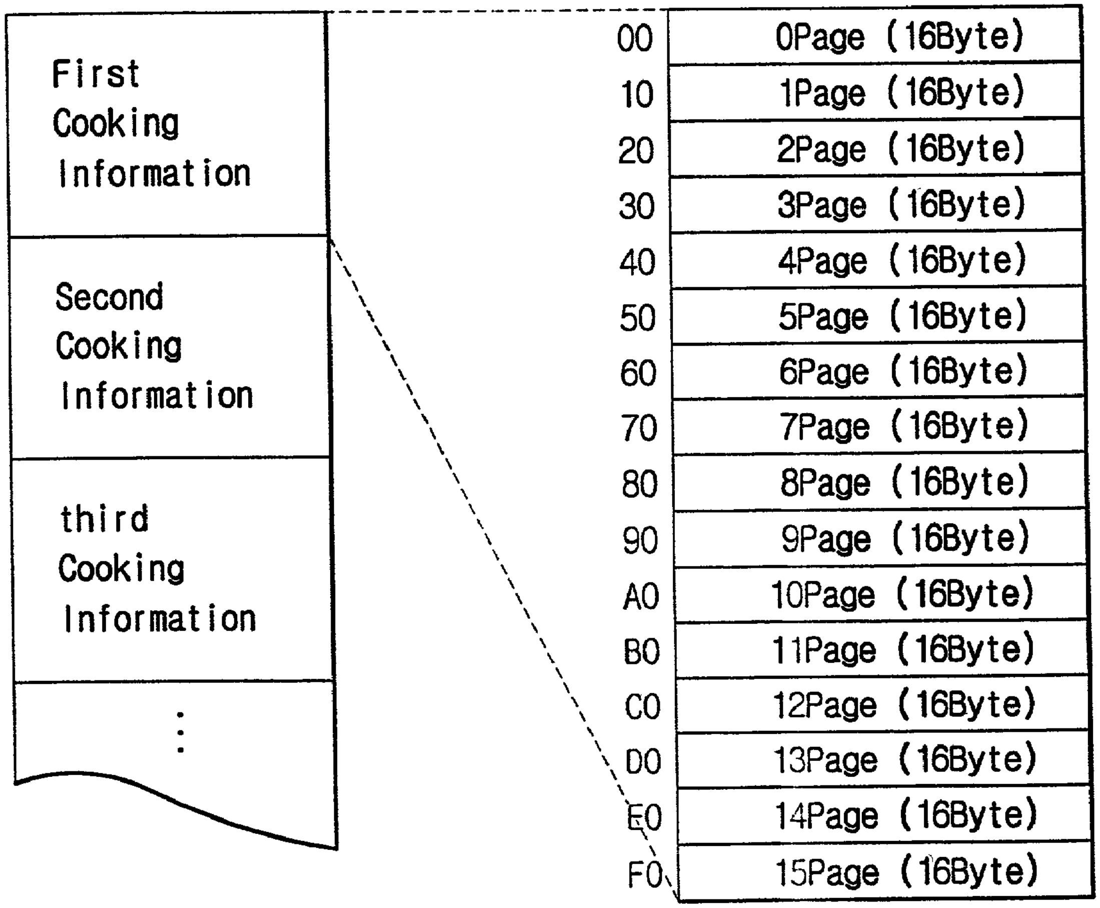
FIG. 4*a* is a diagram of a memory map of the memory pack according to the present invention.

FIGS. 4*a* and 4*b* are views showing a memory map of the memory pack 200 of the present invention. Referring to FIG. 4*a*, in an exemplary embodiment, the storage unit 230 has a capacity of 8 Kbytes, in which thirty-two records, each with a size of 256 bytes, are stored. In other words, the storage unit 230 has a capacity enough to store thirty-two pieces of cooking information, each with a size of 256 bytes. Each record of 256 bytes corresponding to each piece of cooking information is divided into sixteen pages, each page with a size of 16 bytes. Some of the sixteen pages are used to store data for cooking, while the remaining pages are used to store additional information data.

Referring to FIG. 4*b*, as described above, a piece of cooking information is divided into 16 pages (00 through F0), each with a size of 16 bytes (M0 through M15). The last byte of each page is used to store a checksum for data error prevention. In page 00, a first page, the cooking information such as a cooking time and a corresponding output are stored, while on pages 10, 20, and 30, and in second, third, and fourth pages, respectively, cooking subjects to be displayed on the displaying unit 140 of the microwave oven are stored. Further, ingredient data is stored as additional cooking data in the remaining pages. The additional cooking data is represented by a blank in FIG. 4*b*.

Figure 5:
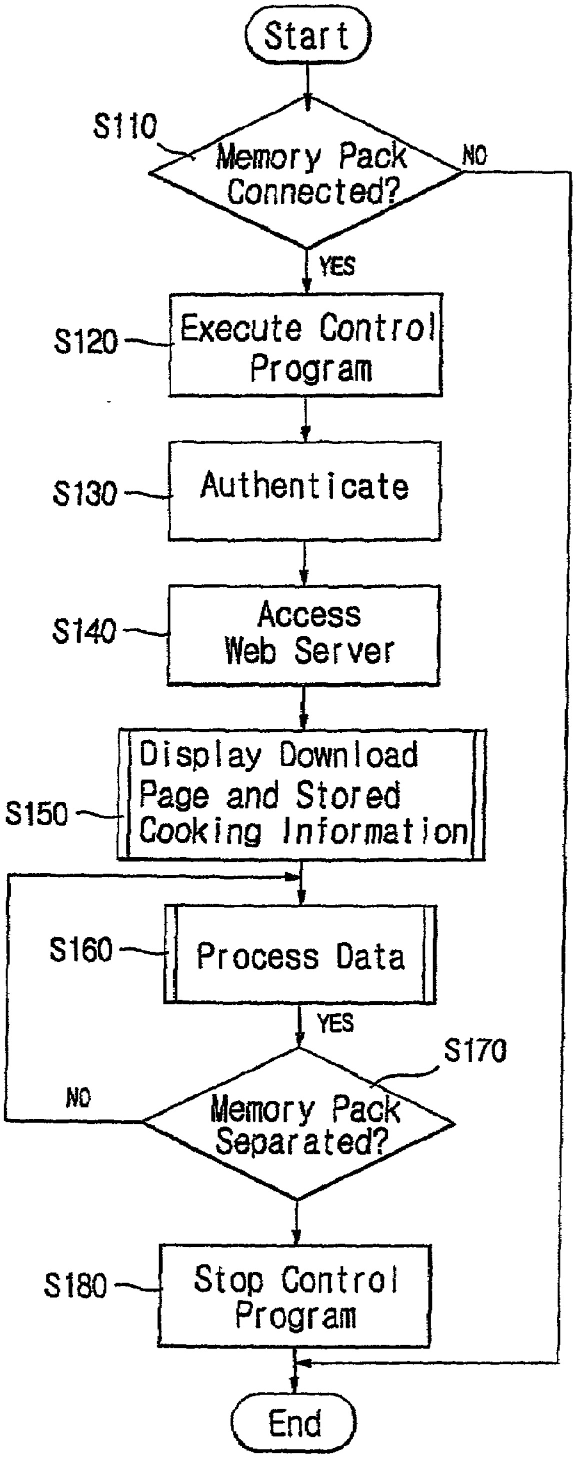
FIG. 5 is a flowchart illustrating a data processing method of the memory pack according to the present invention.

FIG. 5 is a flowchart of a data processing method of the memory pack 200 of this invention. Hereinafter, the data processing method for the memory pack 200 of this invention will be described in detail. With the connection terminal 240 disconnected from the oven body 100, at S110, the computer 300 determines whether or not the memory pack 200 is connected to the computer 300. In this case, the computer 300 determines a connection of the memory pack 200 according to information received from the memory pack 200 through the communication port (RS-232C).

If it is determined that the memory pack 200 is connected to the computer 300, at S120, the computer 300 executes a preset control program. The control program is executed to connect the computer 300 to the preset Web server 420 connected to the Internet 410. At S130, an authentication procedure begins where the Web server 420 requests an access code and a secret number to authenticate the computer 300. The computer 300 displays information guiding the user to input the access code and the secret number for the authentication on the monitor. Then, the user inputs the preset access code and the secret number according to a procedure displayed on the monitor. Subsequently, the computer 300 transmits the access code and the secret number inputted by the user to the Web server 420. The Web server 420 identifies the access code and the secret number, and transmits a preset authentication signal to the computer 300 when the user is authenticated. According to the above procedure, the authentication procedure is completed.

Figure 6:
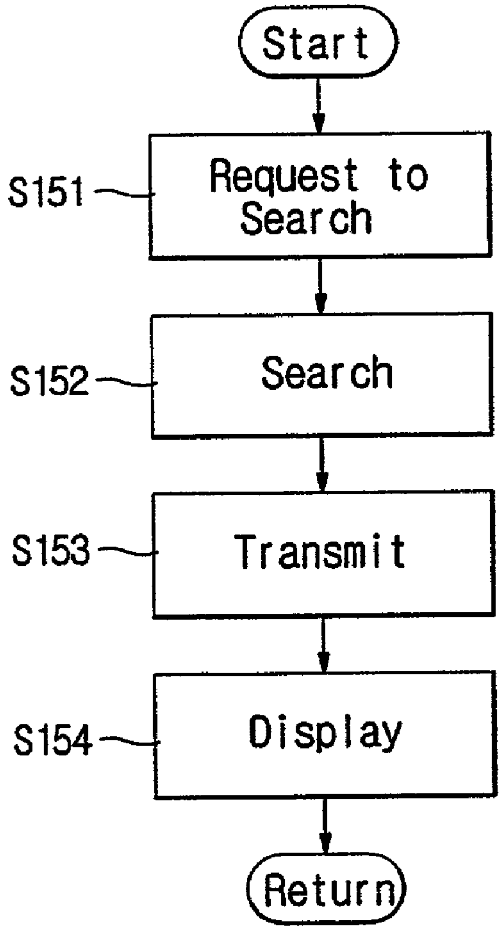
FIG. 6 is a flowchart illustrating a process of accessing a web server in accordance to the present invention.

At S140, a user accesses the Web server 420, as shown in detail in FIG. 6. Referring to FIG. 6 at S151, the computer 300 requests the memory pack 200 to search for cooking information stored in the storage unit 230 according to the execution of the preset control program. At S152, the memory pack control unit 210 searches for cooking information stored in the storage unit 230 in response to the search request. At S153, the memory pack control unit 210 transmits the searched cooking information to the computer 300 through the interlace unit 220. At S154, the computer 300 receives the searched cooking information from the memory pack 200 and displays the information on a monitor.

Referring back to FIG. 5, after the authentication is completed, at S150, the Web server 420 transmits a download page for downloading cooking information to the computer 300, thus allowing the computer 300 to display the download page on the monitor. Further, the computer 300 reads the cooking information stored in the memory pack 200 and displays the cooking information on the monitor, thus enabling the user to see the cooking information stored in the memory pack 200. Accordingly, the user may see both the information stored in the memory pack 200 and the information downloaded from the Internet 410. At S160, the computer 300 processes functions including data downloading, and adding and deleting according to information (or command) inputted by the user as described in detail in FIG. 7.

Figure 7:
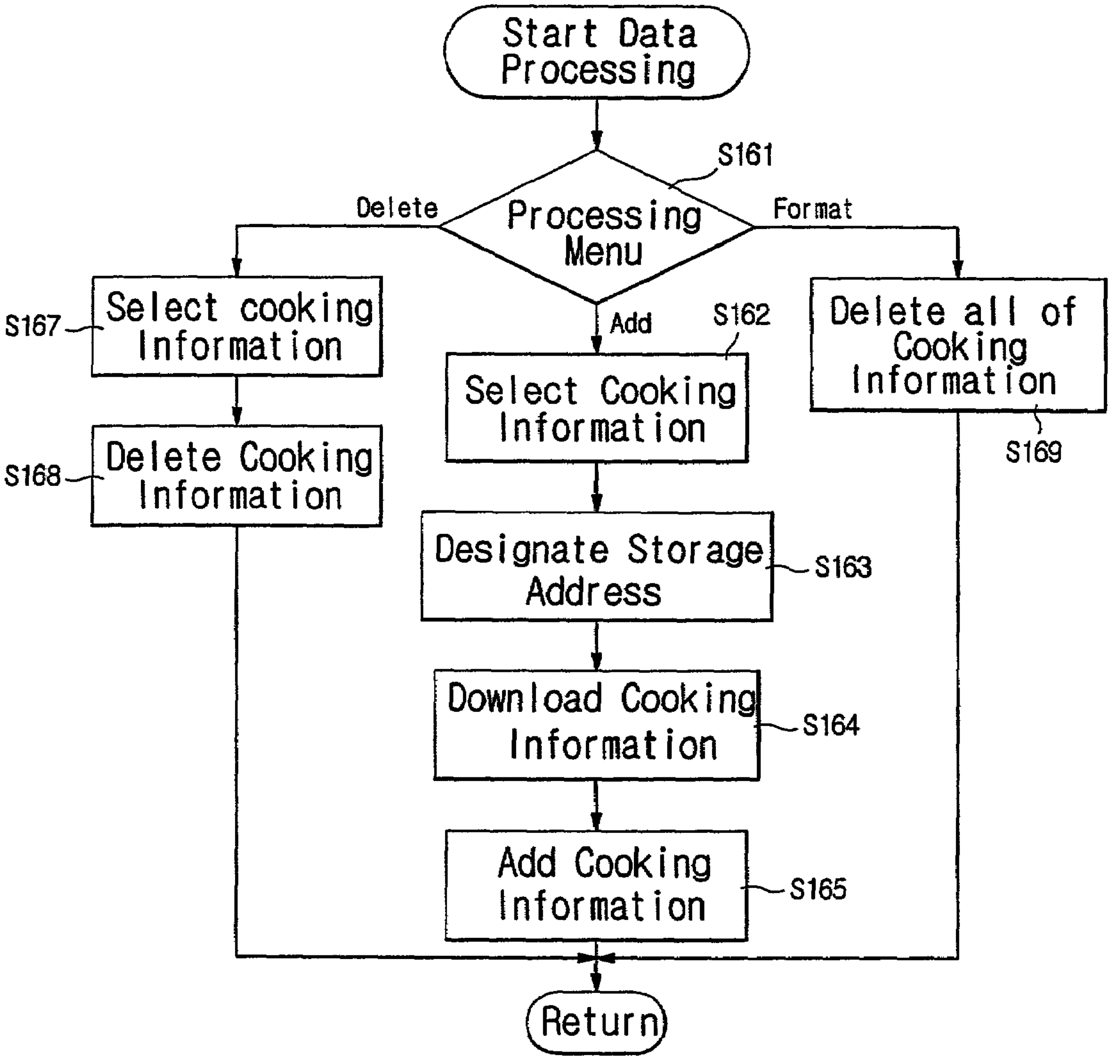
FIG. 7 is a flowchart illustrating a computer processing functions including data downloading, and adding and deleting according to information (or command) inputted by a user in accordance to the present invention.

Referring to FIG. 7, at S161, the computer 300 determines whether the data is to be added, deleted or formatted in response to the command inputted by the user. If the user clicks a delete icon, the computer determines that the data is to be deleted. At S167, the user selects desired cooking information to be deleted. Accordingly, at S168, the computer 300 outputs a delete command to delete cooking information selected by the user through the communication port 252. The delete command from the computer 300 is transmitted to the interface unit 220 in the memory pack 200 through the cable 250; thus, allowing the delete command to be transmitted to the memory pack control unit 210. At S169, the memory pack control unit 210 deletes cooking information corresponding to the delete command among pieces of cooking information stored in the storage unit 230.

Further, at S161 if the user clicks an add icon, the computer determines that data is to be added. For data addition, at S162 the user selects cooking information in a download page. At this time, the computer 300 may set an address to store desired cooking information to be added by two methods. First, the computer 300 may designate the address arbitrarily by searching for a current vacant address. Alternatively, the user may designate a desired address. In this case, the computer 300 requests the desired address from the user, and the user inputs the desired address to the computer 300. Therefore, at S163, the computer designates the address to store the additional cooking information.

When the address to store the additional cooking information is designated, at S164, the computer 300 downloads the cooking information selected by the user. Then, the computer 300 transmits an add command and the designated address to the memory pack 200, prior to transmitting the downloaded data to the memory pack 200. At S165, the memory pack control unit 210 writes the downloaded data to the designated address of the storage unit 230 according to the add command.

At S170, when the data processing is completed, the computer 300 determines whether or not the memory pack 200 is separated from the computer 300. Specifically, the computer 300 detects a signal inputted to the communication port from the memory pack 200 in order to determine the separation of the memory pack 200. In this case, if the computer 300 does not detect the signal, the computer 300 determines that the memory pack 200 is separated from the computer 300. If the computer 300 determines that the memory pack 200 is separated from the computer 300, the computer 300 stops the control program in execution.

Figure 8A:
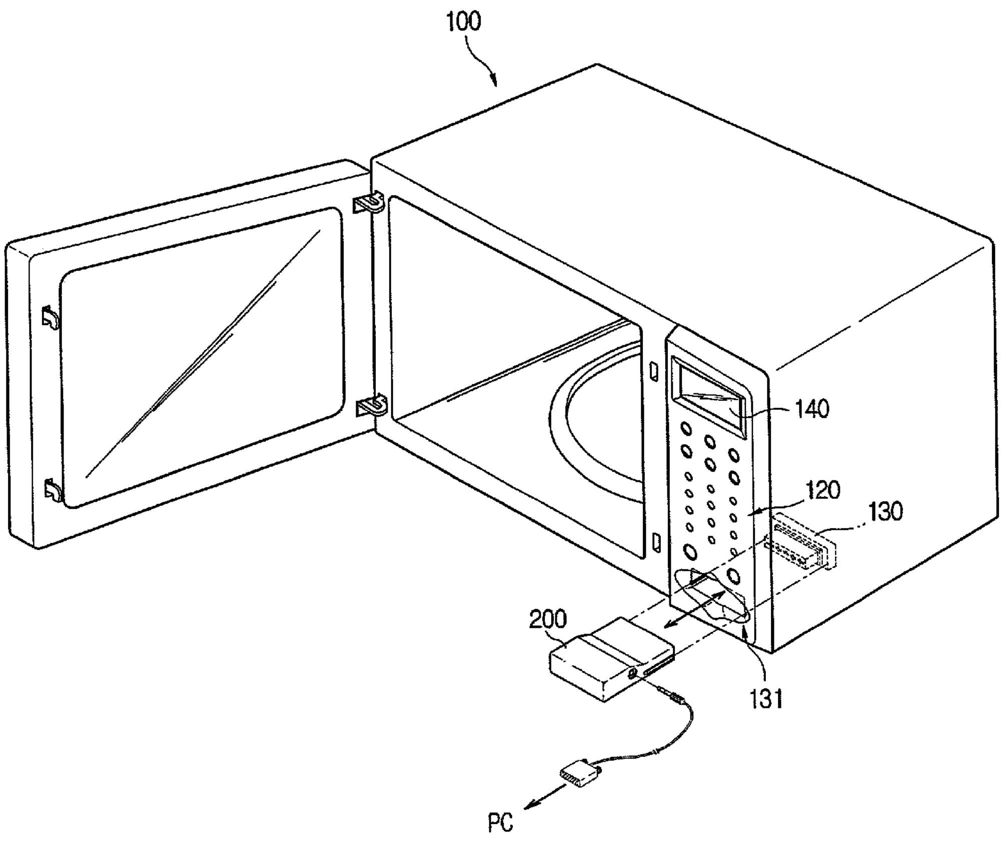
FIGS. 8*a* and 8*b* are perspective views showing the installation of the memory pack on a microwave according to the present invention.
Figure 8B:
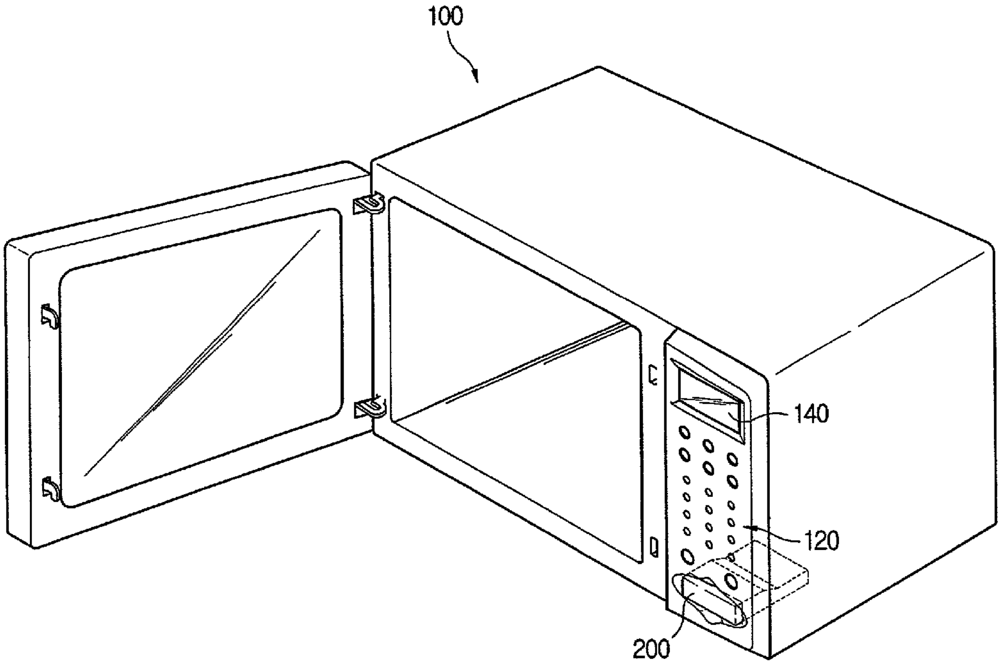

FIGS. 8*a* and 8*b* are perspective views showing the installation of the memory pack 200 of this invention. When the above process is completed, the user separates the cable 250 from the memory pack 200 and inserts the memory pack 200 in an insertion hole 131 formed in the oven body 100, as shown in FIGS. 8*a* and 8*b*. Accordingly, the user may cook a particular food by selecting the desired cooking information for that particular food from the cooking information stored in the memory pack 200.

As described above, the present invention provides a data processing method for a memory pack of an Internet microwave oven, which displays on a monitor cooking information stored in the memory pack by connecting the memory pack to a computer; thus, enabling the user to see the stored cooking information. Further, the data processing method of the present invention is advantageous in that in the case of adding cooking information to the memory pack, the computer may automatically set an address in the memory pack to store the cooking information without user intervention. In the alternative, the user may set the address directly.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of operating an oven, comprising:

providing the oven with a housing and memory pack which is removably connectable within a cavity of the housing to a controller of the oven;

disconnecting the memory pack from the oven and connecting the memory pack to a computer;

executing a preset control program to automatically access a preset Web server with the computer in response to a signal provided by the memory pack upon connection of the memory pack to the computer;

providing a preset access code and a secret number to the Web server to authenticate a user of the computer;

displaying the cooking information stored in the memory pack on the computer;

changing the cooking information stored in the memory pack according to a user operation;

downloading cooking information from the Web server to the computer and storing the downloaded cooking information on the memory pack;

disconnecting the memory pack from the computer and reconnecting the memory pack to the oven; and operating the oven according to the cooking information stored in the memory pack, wherein the information is stored in the memory pack according to a memory map having plural pages, the last byte of each of the plural pages storing a checksum for data error prevention.

2. The method as recited in claim 1, further comprising:

determining whether the memory pack is separated from the computer; and stopping the execution of the preset control program when the memory pack is separated from the computer.

3. The method as recited in claim 1, wherein the execution of the preset control program further comprises:

sending a request to the memory pack to search for particular cooking information among the stored cooking information, transmitting the cooking information searched to the computer, and displaying the searched cooking information.

4. The method as recited in claim 1, wherein the changing of the cooking information comprises formatting all of the displayed cooking information.

5. The method as recited in claim 4, wherein the changing of the cooking information comprises:

selecting cooking information from the downloaded cooking information;

designating an address to store the selected cooking information in the memory pack; and storing the selected cooking information in the designated address.

6. The method as recited in claim 5, wherein a user designates the address.

7. The method as recited in claim 4, wherein the changing of the cooking information further comprises:

searching addresses in the storage unit of the memory pack, determining whether a predetermined address is vacant, and designating the predetermined address as a storage address provided the predetermined address is vacant.

8. A method of updating a memory pack which stores cooking information for an oven, the method comprising:

removing the memory pack from the oven;

connecting the memory pack to a computer;

connecting the computer to a Web server in response to connecting the memory pack to the computer;

authenticating the computer to the Web server based on transmitting an access code and a secret number from the computer to the Web server; and transmitting a preset authentication signal to the computer allowing a user to access data stored in the memory pack and data from the Web server, wherein the cooking information is stored in the memory pack according to a memory map having plural pages, the last byte of each of the plural pages storing a checksum for data error prevention.

9. The method of claim 8, further comprising:

determining whether the memory pack is connected to the computer.

10. The method of claim 8, further comprising:

downloading data from the Web server to the computer;

displaying the data from the memory pack and the data downloaded from the Web server on the computer; and selecting data from the memory pack to be deleted or data from the Web server to be formatted in response to an input command from a user of the computer.

11. The method of claim 10, further comprising:

transmitting an add command and a designated address from the computer to the memory pack; and storing the selected data in the designated address on the memory pack.

12. The method of claim 11, wherein the computer or the user designates the address to store the selected data.

13. The data processing method as recited in claim 10, wherein the data in the memory pack and the data downloaded from the Web server comprises cooking information.

14. The data processing method as recited in claim 8, wherein the oven comprises an Internet microwave oven.

15. The method of claim 8, further comprising:

downloading data from the Web server to the computer;

displaying the data from the memory pack and the data downloaded from the Web server on the computer;

updating the data stored on the memory pack by selectively modifying or storing the displayed memory pack data or the data downloaded from the Web server; and reinstalling the memory pack in the oven.

16. A microwave oven, comprising:

a memory pack which stores cooking information for use by the oven and which is detachable from the oven and connectable to a unit which accesses a Web server, to enable the unit to download additional cooking information from the Web server to the memory pack;

wherein the memory pack comprises:

a memory which stores at least one of the cooking information or the additional cooking information;

a first connector which connects the memory pack to the oven when the memory pack is attached to the oven, and a second connector through which the memory pack is connectable to the unit and which is accessible only when the memory pack is detached from the oven, the second connector being an audio plug-in mini phone jack; and an oven body having a predetermined shape and a cavity formed to receive the memory pack within the predetermined shape of the oven body.

* * * * *